United States Patent [19]

Amano et al.

[11] Patent Number: 5,159,490

[45] Date of Patent: Oct. 27, 1992

[54] MIRROR

[75] Inventors: Takashi Amano, Nagoya; Tetsuo Oka, Obu; Junichi Mita, Kariya; Masami Ishii, Toyota, all of Japan

[73] Assignee: Aisin Seiki Kabushiki Kaisha, Kariya, Japan

[21] Appl. No.: 709,603

[22] Filed: Jun. 3, 1991

[30] Foreign Application Priority Data

Jun. 4, 1990 [JP] Japan .................. 2-145845

[51] Int. Cl.$^5$ .............................................. G02B 5/28
[52] U.S. Cl. .................................. 359/584; 359/585; 359/884
[58] Field of Search ................ 359/584, 585, 589, 884

[56] References Cited

U.S. PATENT DOCUMENTS

| | | | |
|---|---|---|---|
| 4,214,818 | 7/1980 | Choyke et al. | 359/845 |
| 4,669,074 | 5/1987 | Hsieh et al. | 250/201.5 |
| 4,773,717 | 9/1988 | Pai et al. | 359/589 |
| 4,838,648 | 6/1989 | Phillips et al. | 359/585 |
| 4,888,759 | 12/1989 | Hazol et al. | 250/201.5 |
| 4,930,866 | 6/1990 | Berning et al. | 359/589 |
| 5,055,358 | 10/1991 | Livingston et al. | 359/580 |
| 5,080,455 | 1/1992 | King et al. | 359/350 |

FOREIGN PATENT DOCUMENTS

| | | |
|---|---|---|
| 63-163402 | 7/1988 | Japan . |
| 64-34603 | 3/1989 | Japan . |
| 60-212704 | 10/1989 | Japan . |

*Primary Examiner*—Bruce Y. Arnold
*Assistant Examiner*—J. Ryan
*Attorney, Agent, or Firm*—Finnegan, Henderson, Farabow, Garrett and Dunner

[57] ABSTRACT

A mirror comprises a first layer being of a transparency, a second layer mounted on the first layer and being in the form of a translucent metal thin film with a thickness of less than 350Å, a third layer mounted on the second layer and being in the form of a transparent oxide or fluoride of a metal and a fourth layer mounted on the third layer and being in the form of a thin metal to be used as a reflecting member.

7 Claims, 1 Drawing Sheet

MIRROR

BACKGROUND OF THE INVENTION

1. Field of Invention

The present invention relates to a mirror and in particular to a mirror used as a rear view mirror of a motor vehicle.

2. Discussion of Related Art

It is well known that a rear view mirror should be glare-proof from the view point of safety in driving a motor vehicle. In order to comply with the foregoing requirement, various mirror have been provided or proposed as shown in, for example, Japanese Utility Model Registration Laid-open Pring No.64(1989)-34603, Japanese Patent Laid-Open Print No.60(1985)-212704 and Japanese Patent Laid-Open Print No.63(1988)-163402.

However, in each of the foregoing conventional mirrors, it is difficult to adjust easily the reflectance, lightness, brightness, hue and other characteristics.

SUMMARY OF THE INVENTION

It is, therefore, a primary object of the present invention to provide a mirror without the foregoing drawback.

It is another object of the present invention to provide a mirror having adjustable characteristics, such as reflectance, lightness, brightness and hue.

In order to accomplish the foregoing objects, a mirror according to the present invention comprises a first layer being of a transparency, a second layer mounted on the first layer and being in the form of a translucent metal thin film with a thickness of less than 350 Å, a third layer mounted on the second layer and being in the form of a transparent oxide or fluoride of a metal, and a fourth layer mounted on the third layer and being in the form of a thin metal to be used as a reflecting member.

BRIEF DESCRIPTION OF THE DRAWINGS

The above and other objects, features and advantages of the present invention will be become more apparent and more readily appreciated from the following detailed description of preferred exemplary embodiments of the present invention, taken in connection with the accompanying drawings, in which.

DETAILED DESCRIPTION OF THE PREFERRED EMBODIMENTS

Figure 1:
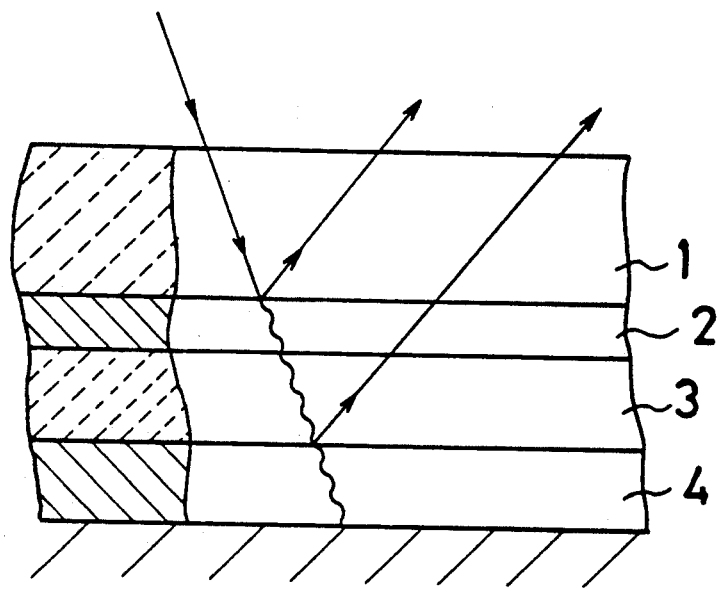
FIG. 1 is a cross-sectional view of a portion of a mirror according to the present invention.

Referring now to FIG. 1 showing a partial portion of a mirror according to one embodiment of the present invention, the mirror, which is formed into a built-up configuration, includes a first layer 1, a second layer 2, a third layer 3 and a fourth layer 4. These layers 1–4 are carried in a casing or frame (not shown).

As the first layer 1, a transparent material such as a glass is used. Instead of the glass, transparent paint which is applied on the second layer 2 can be used.

The second layer 2 is in the form of a translucent metal thin film having a thickness of less than 350 Å. As the metal, Al, Cr, Ag, Au, Pt and alloys of each of the foregoing materials. The second layer 2 is at one of the transparent function and reflection function.

The third layer 3 is in the form of a transparent oxide or fluoride of a metal such as $Ta_2O_5$, $TiO_2$, $ZrO_2$, $SiO_2$, $MgF$, $Y_2O_3$, $LiNbO_3$, and $ZnO$. The refractive index of each material of the third layer 3 is not restricted or limited.

The fourth layer 4 is in the form of metal thin film and is used as a reflecting film. A raw material and the thickness of the fourth layer 4 depend on the desired reflectance.

In the foregoing embodiment, the brightness and color tone of the reflected light mainly depend on the thickness of the second layer 2 and the third layer 3, respectively.

Figure 2:
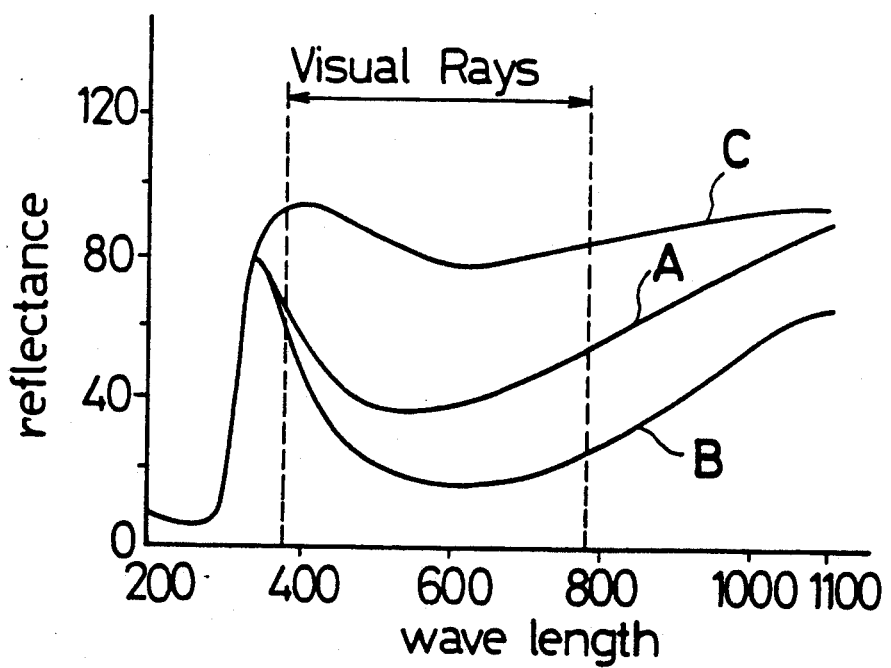
FIG. 2 is a graph showing the relationship between the reflectance and the wave length of the light.

A single Table attached to this specification as an appendix, two embodiments of the present invention, which are indicated by characters (A) and (B), respectively are compared with a conventional example indicated by character (C). The conventional example fails to have a layer corresponding to the second layer of the present invention. In the Table, the evaluation is classified into three grades - "excellent", "good" and "bad" when the reflectance is 45–55%, less than 45% and above 55% respectively. This criteria is determined in light of the fact that the mirror should not be highly bright when it is used as a rear-view mirror of a motor vehicle. The foregoing "45–55%" is regarded as a best mode. The relationship between the reflectance and the wave length in regard to each example in the Table is illustrated in a graph as shown in FIG. 2. The colors of the above examples (A), (B) and (C) are somewhat dark brown, dark brown and light brown, respectively.

Royal purple (dark blue) reflected light is obtained when the second layer is made of Al (Cr) with a thickness of 35 (40)Å, the third layer is made of $Ta_2O_5$(-$Ta_2O_5$) with a thickness of 2000 (500)Å, and the fourth layer Cr (Cr) with a thickness of 0.1 (0.1)μm.

As apparent from the foregoing description, alternation of the materials of the layers and the thickness of each layer, a wide range of colors can be obtained in addition to the foregoing colors such as pink, green, yellow and gold.

In order to obtain the foregoing structure in layers, sputtering method, ion-plating method and so on are available.

Obviously, numerous modifications and variations of the present invention are possible in light of the above teachings. It is therefore to be understood that within the scope of the appended claims, the invention may be practised otherwise than as specifically described herein.

TABLE

|  | 2nd Layer | 3rd Layer | 4th Layer | Evaluation |
| --- | --- | --- | --- | --- |
| Embodiment (A) | raw material: Al thickness: 35 Å | raw material: $Ta_2O_5$ thickness: 500 Å | raw material: Al thickness: 0.15 μm | ⊙ |
| Embodiment (B) | raw material: Al thickness: 70 Å | raw material: $Ta_2O_5$ thickness: 500 Å | raw material: Al thickness: 0.15 μm | ○ |
| Conventional | — | raw material: $Ta_2O_5$ | raw material: Al | X |

TABLE-continued

| | 2nd Layer | 3rd Layer | 4th Layer | Evaluation |
|---|---|---|---|---|
| Example | | thickness: 500 Å | thickness: 0.15 μm | |

What is claimed is:

1. A rear-view mirror for a motor vehicle comprising
a first transparent layer;
a second layer directly formed on the first layer and being in the form of a translucent metal thin film having a thickness of less than 100 Angstroms;
a third layer directly formed on the second layer and being in the form of transparent oxide or fluoride of metal; and
a fourth layer directly formed on the third layer and being in the form of a thin metal layer to be used substantially as a reflecting member.

2. A mirror according to claim 1 wherein the metal thin film of the second layer is a metal or an alloy from the group consisting of Al, Cr, Ag, Au, and Pt.

3. A mirror according to claim 1 wherein the metal of the fourth layer is the same as the metal of the second layer.

4. A rear-view mirror for a motor vehicle comprising
a first transparent layer;
a second layer directly formed on the first layer and being in the form of a translucent aluminum thin film having a thickness in the range of about 35 to 70 Angstroms;
a third layer directly formed on the second layer and being in the form of transparent oxide or fluoride metal; and
a fourth layer directly formed on the third layer and being in the form of a thin aluminum layer to be used as a reflecting member for reflecting substantially all of incident light.

5. A mirror according to claim 4 wherein the reflectance of the mirror is in the range of approximately 45-55 percent.

6. A mirror according to claim 4 wherein the metal thin film of the second layer is a metal or an alloy from the group consisting of Al, Cr, Ag, Au, and Pt.

7. A mirror according to claim 4 wherein the metal of the fourth layer is the same as the metal of the second layer.

* * * * *